United States Patent [19]
Ogata

[11] Patent Number: 5,117,425
[45] Date of Patent: May 26, 1992

[54] COMMUNICATION INTERFACE

[75] Inventor: Yukihiko Ogata, Kawasaki, Japan

[73] Assignee: Canon Kabushiki Kaisha, Tokyo, Japan

[21] Appl. No.: 664,472

[22] Filed: Mar. 4, 1991

Related U.S. Application Data

[63] Continuation of Ser. No. 329,554, Mar. 28, 1989, abandoned.

[30] Foreign Application Priority Data

Mar. 31, 1988 [JP] Japan ................................ 63-076162
Mar. 31, 1988 [JP] Japan ................................ 63-076163

[51] Int. Cl.$^5$ ............................................. H04J 3/12
[52] U.S. Cl. .................................. 370/110.1; 370/85.1; 379/94
[58] Field of Search .............. 370/85.1, 85.2, 85.6, 370/94.1, 110.1; 340/825.5, 825.51; 379/93, 94, 100

[56] References Cited

U.S. PATENT DOCUMENTS

| | | | |
|---|---|---|---|
| 4,242,749 | 12/1980 | Takezoe | 370/90 |
| 4,689,789 | 8/1987 | Herger | 370/110.1 |
| 4,722,082 | 1/1988 | Furuya et al. | 370/110.1 |
| 4,792,800 | 12/1988 | Fujioka et al. | 370/85 |
| 4,835,769 | 5/1989 | Donaghue, Jr. et al. | 370/85 |
| 4,884,269 | 11/1989 | Duncanson et al. | 370/110.1 |

Primary Examiner—Douglas W. Olms
Assistant Examiner—Alpus H. Hsu
Attorney, Agent, or Firm—Fitzpatrick, Cella, Harper & Scinto

[57] ABSTRACT

A communication interface for the protocol of a layer 1 using an ISDN digital communication network, includes: a first communication controller to execute the communication control for a standard terminal; a second communication controller to execute the communications control for a network terminal device; and a switch between to switch the first and second communication controllers. The first communication controller executes the control as a layer 1 of the ISDN standard terminal. The second communication controller executed the control as a layer 1 of the network terminal device which is connected to the ISDN. The communication interface can execute the two-way connection test separately from the ISDN network and can be used in three modes of the ISDN layer 1 interface, TE layer 1 interface, and NT layer 1 interface.

17 Claims, 6 Drawing Sheets

COMMUNICATION INTERFACE

This application is a continuation of application Ser. No. 07/329,554 filed Mar. 28, 1989, now abandoned.

BACKGROUND OR THE INVENTION

1. Field of the Invention

The present invention relates to a communication interface for the protocol of a layer 1 (electrophysical layer) of the communication using a digital communication network such as an ISDN (Integrated Services Digital Network) or the like.

2. Related Background Art

Figure 6:
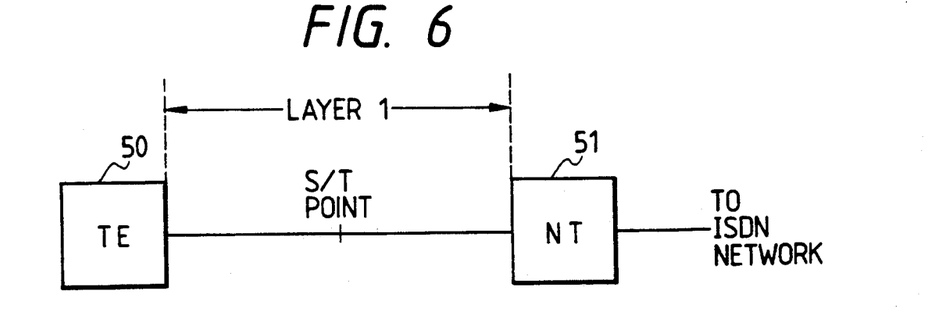
FIG. 6 is a connection format diagram for explaining a standard construction of an ISDN subscriber.

As shown in FIG. 6, in a standard construction of the ISDN subscribers, a terminal device (hereinafter, referred to as a TE) 50 such as a telephone, facsimile apparatus, or the like is connected to an ISDN network via a network terminal device (hereinafter, referred to as an NT) 51.

The applicant of the present invention has already applied a communication system or communication apparatus using the ISDN disclosed in U.S. patent application Ser. Nos. 151,309 and 258,768.

In FIG. 6, a transmission path between the TE and the NT is defined as an S/T point by the International Telegraph and Telephone Consultative Committee (CCITT). The interface specification called the layer 1 is recommended.

Figure 4:
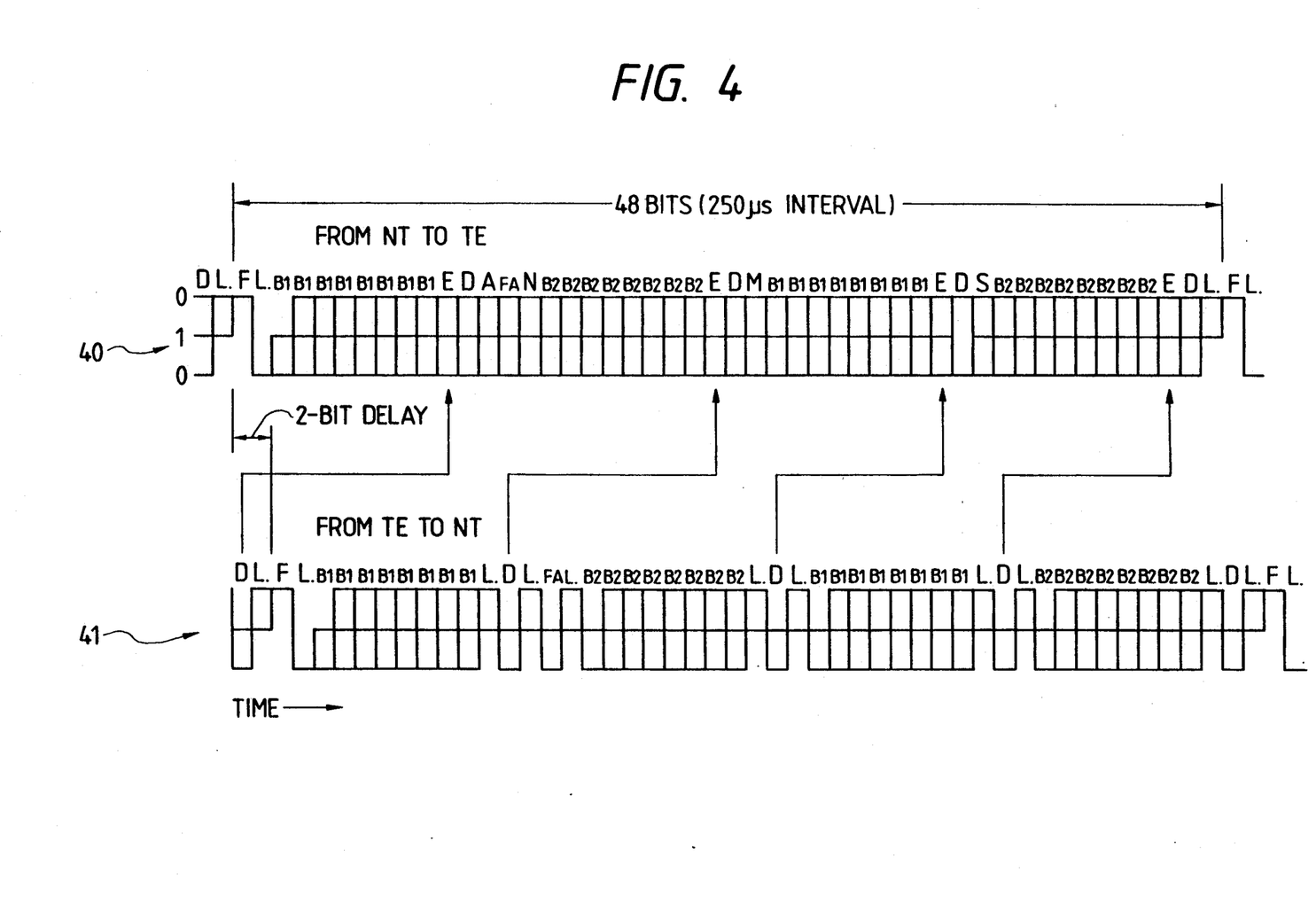
FIG. 4 is a diagram showing a data construction of a frame according to the CCITT recommendation.

As shown in FIG. 4, in each direction of the transmission between the TE and the NT, a bit train is constructed by a frame consisting of 48 bits. The frame construction in the case of transmitting from the TE to the NT is different from that in the case of transmitting from the NT to the TE.

In the case where the TE transmits a bit train of a frame 41 to the NT or in the case where the TE receives a bit train of a frame 40 from the NT, the TE extracts and reproduces a clock signal from the bit train received from the NT and transmits or receives the bit train by using the timing of the clock signal. On the other hand, in the case where the NT transmits the frame 40 to the TE, the NT transmits the bit train by using a clock signal from the ISDN.

In the case where the NT receives the frame 41 from the TE, the NT extracts and reproduces a clock signal from the bit train received from the TE and receives the bit train from the TE by using the clock signal.

On the other hand, in the idling state, that is, in the use waiting state, the transmission path between the TE and the NT is set into the stop state to reduce the electric power consumption. Therefore, in order to correctly communicate, the layer 1 in the stop state is set into the start state. On the contrary, when the communication is completed, the layer 1 in the start state is set into the stop state.

Figure 7A:
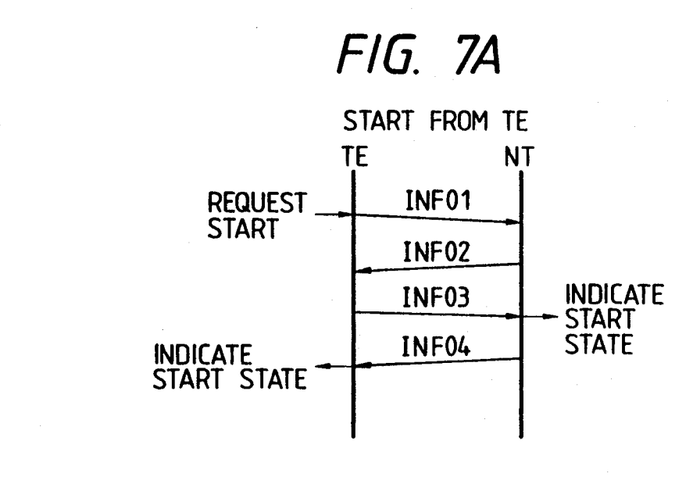
FIGS. 7A to 7C are diagrams showing start and stop procedures for the ISDN layer 1.
Figure 7B:
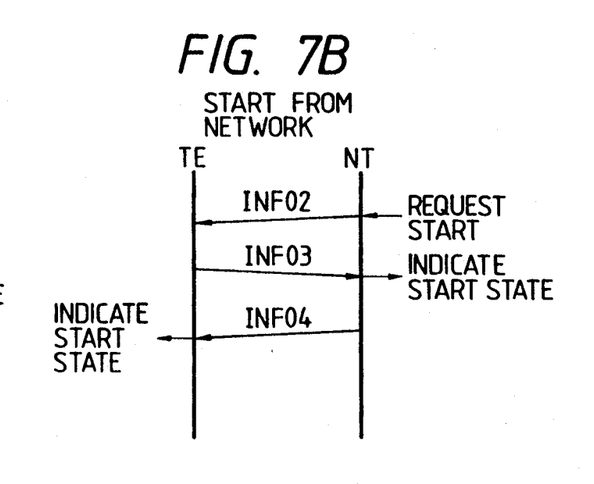
Figure 7C:
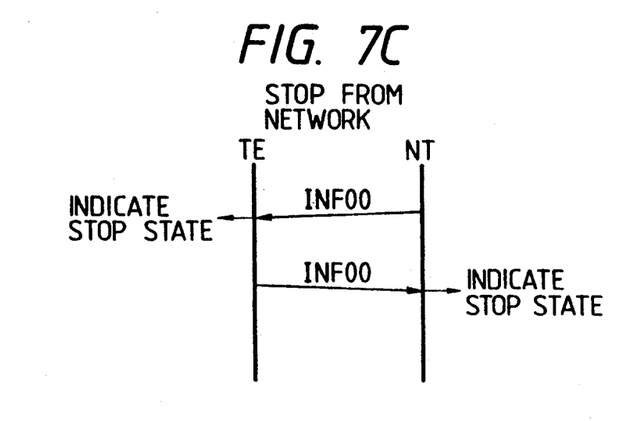

FIG. 7 shows start and stop procedures in such a case. FIG. 7A shows the start procedure in the case of performing a start request from the TE side. INF01 denotes a signal to indicate the start request to the NT. INF02 represents a signal which is necessary for the TE to perform the synchronization. That is, the INF02 is the signal in which the channel bits ($B_1$, $B_2$, D) are 0 in the frame 40. On the basis of the INF02 signal, the TE extracts a clock signal which is necessary to transmit data. INF03 denotes a signal indicating that the synchronization was obtained for the NT. INF04 is a signal to indicate the transmission of data to the TE. FIG. 7B shows the start procedure in the case where the start request is executed from the NT to the TE in response to the terminating from the ISDN network side. FIG. 7C shows the stop procedure from the network side. As mentioned above, in the S/T point interface of the ISDN, the bit construction of the frame differs dependence on the transmitting direction. In addition, the control functions of the NT and TE also differ. Therefore, in the control of the conventional ISDN layer 1, the control functions are respectively independently distinguished for the TE and NT.

Therefore, for the S/T point, an interface for the NT layer 1 must be provided for the NT, while another interface for the TE layer 1 must be also provided for the TE.

Further, in the interfaces for the TE layer 1 and NT layer 1, since the clock signals which are used upon transmission and reception differ, there is a drawback such that even when two TE terminals are simply connected, the two-way connection test (maintenance and inspection services such as failure analysis and the like) of each TE terminal cannot be executed.

Therefore, even in the case of executing the two-way connection test, the TE terminal must be also connected to the ISDN via the NT in a manner similar to the case where the actual data communication is performed, so that there is a drawback such that the two-way connection test of the TE terminal cannot be easily executed.

SUMMARY OF THE INVENTION

It is an object of the present invention to eliminate the drawbacks in the conventional techniques as mentioned above.

Another object of the invention is to provide a communication interface which can be used for any of a TE layer 1 interface and an NT layer interface.

Still another object of the invention is to provide a communication interface in which the two-way connection tests can be executed among TE terminals without passing through a digital communication network such as an ISDN or the like.

Still another object of the invention is to provide a communication interface which can easily execute the two-way connection test of a terminal without using a line.

Still another object of the invention is to provide a communication interface which can be used as an interface of three modes by a one-chip LSI.

Still another object of the invention is to provide a communication interface which can select either one of the communication control for a standard terminal of the ISDN and the communication control for a network terminal device of the ISDN.

Still another object of the invention is to provide a communication interface comprising: first control means for transmitting and receiving data by using a clock signal which is extracted from reception data; and second control means for receiving data by using the extracted clock signal and for transmitting data by using another clock signal whose period is different from that of the above-mentioned clock signal.

The above and other objects and features of the present invention will become apparent from the following detailed description and the appended claims with reference to the accompanying drawings.

DETAILED DESCRIPTION OF THE PREFERRED EMBODIMENT

A preferred embodiment of the present invention will be described in detail hereinbelow with reference to the drawings.

Figure 1:
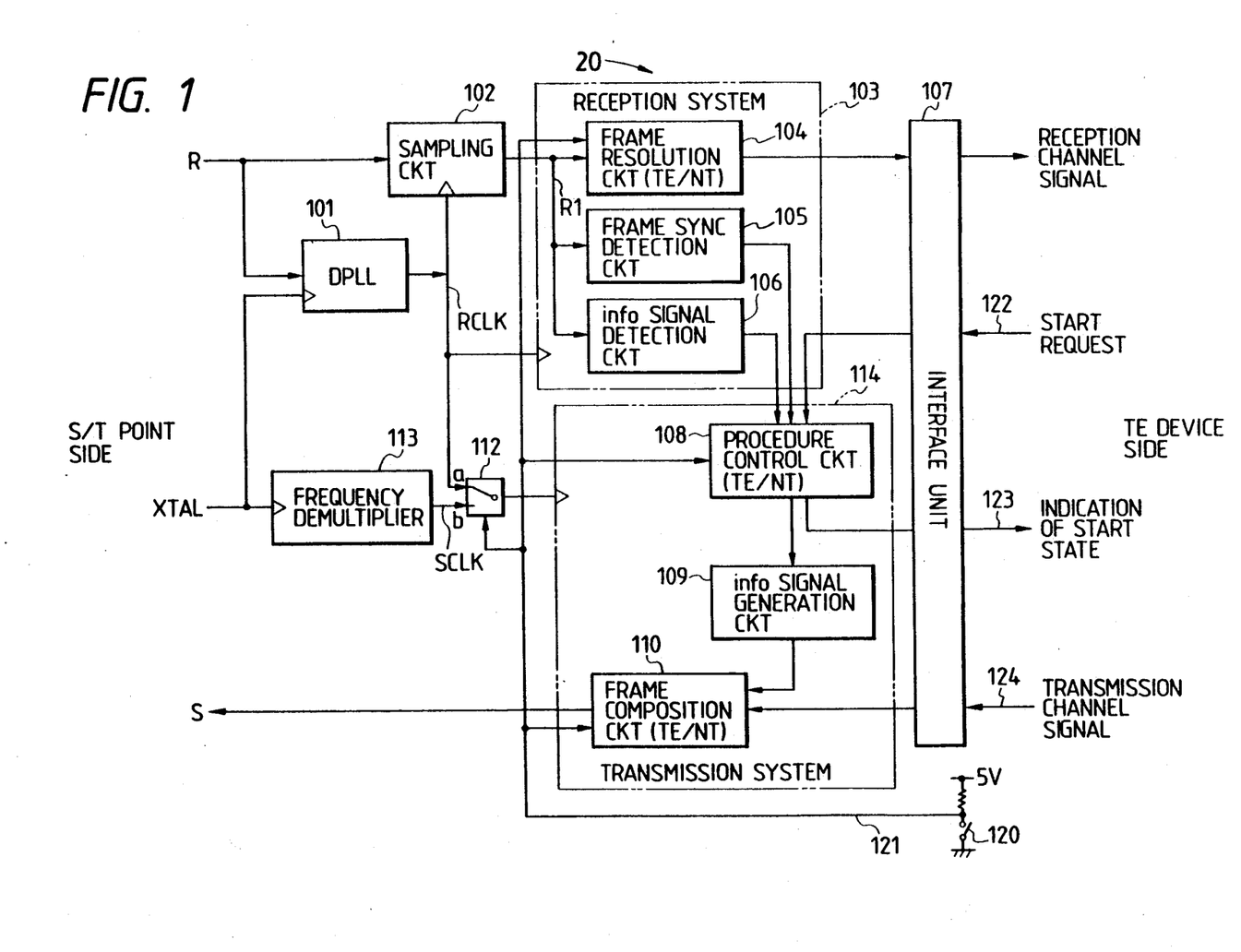
FIG. 1 is a block diagram showing a construction of a communication interface of an embodiment of the present invention.

FIG. 1 is a block diagram showing a schematic construction of an ISDN layer 1 interface (i/f) unit 20 as an embodiment of the present invention. FIG. 2 is a diagram showing the connection of a terminal device using the ISDN i/f unit 20 in three cases of a reference model of an ISDN user network interface.

Figures 2A, 2B, 2C:
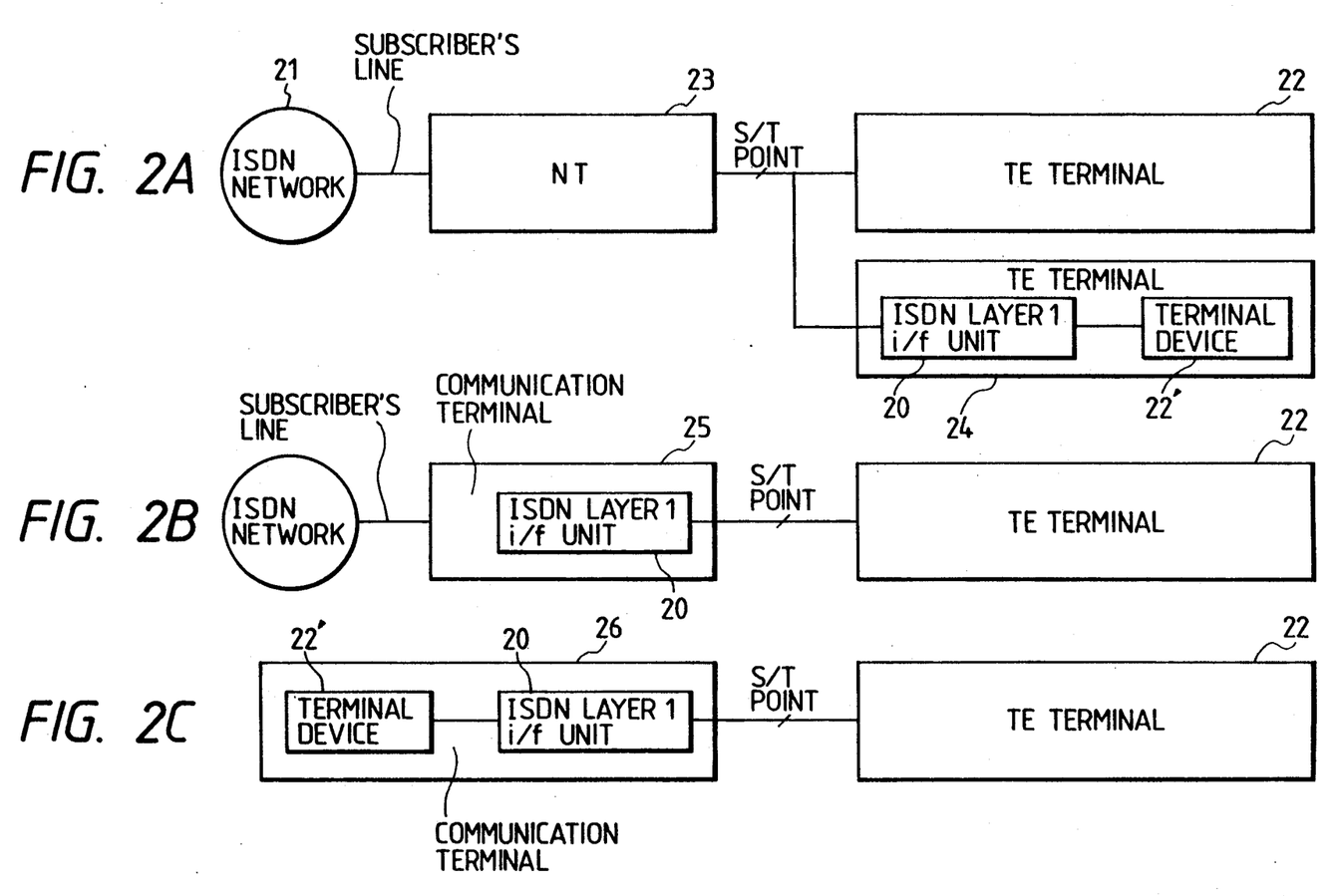
FIGS. 2A to 2C are diagrams showing the connections of terminal devices using an ISDN i/f unit in a reference model of an ISDN user network terminal interface.

FIG. 2A shows the case where the ISDN i/f unit 0 operates as an interface for a TE terminal. Reference numeral 21 denotes an ISDN network and 22 indicates an ISDN standard terminal. Up to eight ISDN standard terminals 22 can be connected to one NT. Reference numeral 23 denotes an NT (device) which functions as a terminal (Network terminal device) of the network and interface side transmission path, and 24 indicates a TE terminal including the ISDN i/f unit 20 and a terminal device 22' of, for instance, a facsimile apparatus or the like.

FIG. 2B shows the case where the ISDN i/f unit 20 provided in a communication terminal 25 is directly connected to the ISDN network 21 and functions as a network terminal device (NT). Further, FIG. 2C shows a communication terminal 26 in an embodiment which functions as a pseudo NT terminal for the connection test of the TE terminal 22 for the S/T point side and in which the connection test can be executed between the TE terminal 22 and the terminal device 22'. In any of the above cases, reference numerals 24 to 26 denote the same communication terminals except that their operations differ.

FIG. 1 is a block diagram showing a detailed construction of the ISDN i/f unit 20 of the communication terminals 24 and 26. The ISDN i/f unit 20 can operate in two modes.

That is, the first mode relates to the case where the ISDN i/f unit 20 functions as an interface for the TE layer 1 as shown in FIG. 2A and the second mode relates to the case where the ISDN i/f unit 20 functions as a pseudo NT layer 1 interface as shown in FIG. 2C.

The ISDN i/f unit 20 is constructed as a one-chip LSI.

In FIG. 1, R denotes a control input signal which is obtained by binarizing a signal (a signal from the NT in the case where the ISDN i/f unit 20 operates as the TE layer 1 or a signal from the TE in the case where it operates as the pseudo NT layer 1) received from an S/T interface. XTAL denotes an original clock signal input from the outside (in the communication terminal 24 or 26). Reference numeral 101 denotes a frequency demultiplexer (DPLL) for extracting the transmission frequency component included in the control input signal R, for frequency demultiplexing the original clock signal XTAL in accordance with the frequency dividing ratio shown by the signal R, and for outputting as a bit rate timing signal (RCLK). Reference numeral 102 denotes a sampling circuit for sampling the control input signal R as the timing of the signal RCLK and for specifying as a reception bit train ($R_1$). The reception bit train specified as mentioned above is as shown in, for instance, FIG. 4.

Reference numeral 103 denotes a reception system circuit. A construction of the circuit 103 will now be described. Reference numeral 104 denotes a frame resolution circuit which receives a switch signal 121 and functions as the TE layer 1 when the switch signal 121 is at the high level, that is, when a switch 120 is set to OFF and functions as the NT layer 1 when the switch signal 121 is at the low level. When the switch signal 121 is at the high level, as shown in FIG. 2A, the frame resolution circuit 104 functions as the TE layer 1 interface and resolves the bit train (40 in FIG. 4) of the frame construction which was sent from the NT through the sampling circuit 102 into the $B_1$, $B_2$, D, and E channels. The resolved signals are output to the terminal device 22' side through an interface unit 107.

On the contrary, when the switch signal 121 is at the low level, the frame resolution circuit 104 functions as the pseudo NT layer 1 interface as shown in FIG. 2C. Therefore, the frame resolution circuit 104 resolves the frame data of the type as shown by 41 in FIG. 4 which was sent from the TE through the sampling circuit 102 into the $B_1$, $B_2$, and D channels so that such frame data can be received. The resolved signals are output to the terminal device 22' side. At this time, the terminal device 22' operates as a pseudo ISDN network.

Reference numeral 105 denotes a frame sync detection circuit for detecting and monitoring the frame synchronization during the receiving process on the basis of a frame bit F obtained from the sampling circuit 102 and for outputting the result to a procedure control circuit 108. Reference numeral 106 denotes an info signal detection circuit to detect an info signal as shown in FIG. 7. When the info signal is detected, the detection circuit 106 outputs the result to the procedure control circuit 108.

Reference numeral 114 denotes a transmission system circuit and its construction will now be described. The procedure control circuit 108 receives output signals from the frame sync detection circuit 105 and info signal detection circuit 106 and also receives a start request signal 122 which is input from the interface unit 107. When the switch signal 121 is at the high level, the transmission system circuit 114 discriminates by the procedure on the TE layer 1 side on the basis of the input signals and instructs an info signal generation circuit 109 to transmit the info signal so as to respond to the NT on the distant side. The circuit 114 also turns on or off an indication signal 123 of the start state in accordance with the progress of the procedure and informs the start or stop state to the terminal device 22' side through the interface unit 107.

On the other hand, when the switch signal 121 is at the low level, the transmission system circuit 114 discriminates by the procedure on the NT layer 1 side on the basis of the input signals and instructs the info signal generation circuit 109 to transmit the info signal so as to respond to the TE terminal on the distant side. Reference numeral 109 denotes the info signal generation circuit to generate the corresponding info signal in accordance with the instruction of the procedure control circuit 108. Reference numeral 110 denotes a frame composition circuit for receiving a transmission channel signal 124 and info signal from the terminal device 22' and for making and outputting a frame signal.

When the switch signal 121 is at the high level (when the switch 120 is set to OFF), the frame composition circuit 110 reconstructs the info signal from the info signal generation circuit 109 and the transmission channel signals 124 of the $B_1$ channel, $B_2$ channel, D channel, and the like which are input from the terminal device 22' into a frame for transmission of the TE layer 1 and outputs as an output signal S to the transmission path side (for instance, like the frame bit train 41 in FIG. 4). At this time, the RCLK is used as a transmission clock signal. On the other hand, when the switch signal 121 is at the low level (when the switch 120 is set to ON), the bit train shown in the frame construction 40 in FIG. 4 is made and the output signal S is output. In this case, the SCLK is used as a transmission clock signal.

Figure 3:
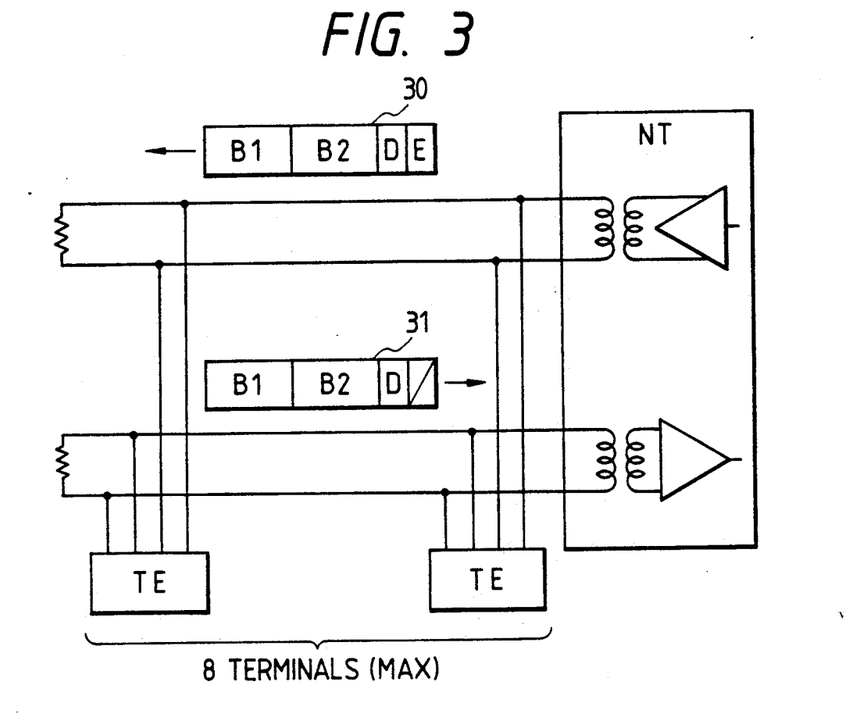
FIG. 3 is a diagram showing a construction of a fundamental interface layer 1.

FIG. 3 is a diagram showing the difference of the frame data depending on the transmitting direction between the NT and TE terminals in the layer 1 as mentioned above.

Reference numeral 30 denotes a frame construction from the NT to the TE terminal and 31 indicates a frame construction from the TE terminal to the NT. $B_1$ and $B_2$ denote information channels of 64 kbits/sec; D indicates a common line signal channel of 16 kbits/sec; and E represents an echo bit.

Returning to FIG. 1, reference numeral 112 denotes a switch to change the connection in correspondence to the level of the switch signal 121. When the switch signal 121 is at the high level, the switch 112 is connected to the side of a contact a as a TE layer 1 mode and the RCLK is input as a clock signal of the transmission system circuit 114. On the contrary, when the switch signal 121 is at the low level, the switch 112 is connected to the side of a contact b as a pseudo NT layer 1 mode and an SCLK, which will be explained hereinafter, is input as a clock signal of the transmission system circuit 114. Reference numeral 113 denotes a frequency demultiplexer for frequency demultiplexing the original clock signal XTAL by a preset frequency dividing ratio and for outputting a pseudo bit rate clock signal SCLK. Reference numeral 20 denotes the switch for switching the switch signal 21 as mentioned above and for indicating whether the communication terminal is allowed to function as the TE layer 1 or the NT layer 1. When the switch 120 is set to OFF, the TE layer 1 is indicated. When the switch 20 is set to ON, the NT layer 1 is indicated.

With the above construction, when the switch 20 is set to OFF (TE layer 1), the RCLK is used as a clock signal of each of the reception system circuit 103 and the transmission system circuit 114. The circuits 103 and 114 operate in accordance with the RCLK. The frame resolution circuit 104 receives the frame from the NT shown by 40 in FIG. 4 and outputs to the TE terminal 22' side by the reception channel. On the other hand, in the transmission mode, the procedure control circuit 108 allows the info signal to be generated in accordance with the control procedure for the TE layer 1 and responds to the NT side by the frame composition circuit 110.

When the switch 120 is set to ON (NT layer 1), the RCLK is used as a clock signal of the reception system circuit 103 and the SCLK is used as a clock signal of the transmission system circuit 114. The frame resolution circuit 104 is set sc as to receive and resolve the frame shown by 41 in FIG. 4. The transmission system circuit 114 is driven by the clock signal (SCLK) of the NT layer 1 and the frame data shown by 40 in FIG. 4 to be transmitted to the TE side is made and output from the frame composition circuit 110.

In the embodiment, the switching of the layer 1 in the ISDN i/f unit 20 has been indicated by the switch 120. However, the invention is not limited to such a method. The switching of the layer 1 can be also obviously designated by a signal, command, or the like from the TE terminal side.

As described above, according to the embodiment, the interface for the ISDN layer 1 having the functions of both of the TE layer 1 and the pseudo NT terminal layer 1 can be constructed. Therefore, for instance, the two-way connection test of the TE terminal can be executed separately from the ISDN network. There is an advantage such that the working efficiencies for the maintenance and inspection services of the TE terminal and NT and the like can be remarkably improved.

In the foregoing embodiment, the example in which the ISDN i/f unit 20 can be selected as the TE layer 1 interface and pseudo NT layer 1 interface has been described. As the second embodiment, an example in which the ISDN i/f unit 20 can be selected as the TE layer 1 interface, NT layer 1 interface, and pseudo NT layer 1 interface will now be described.

Figure 5:
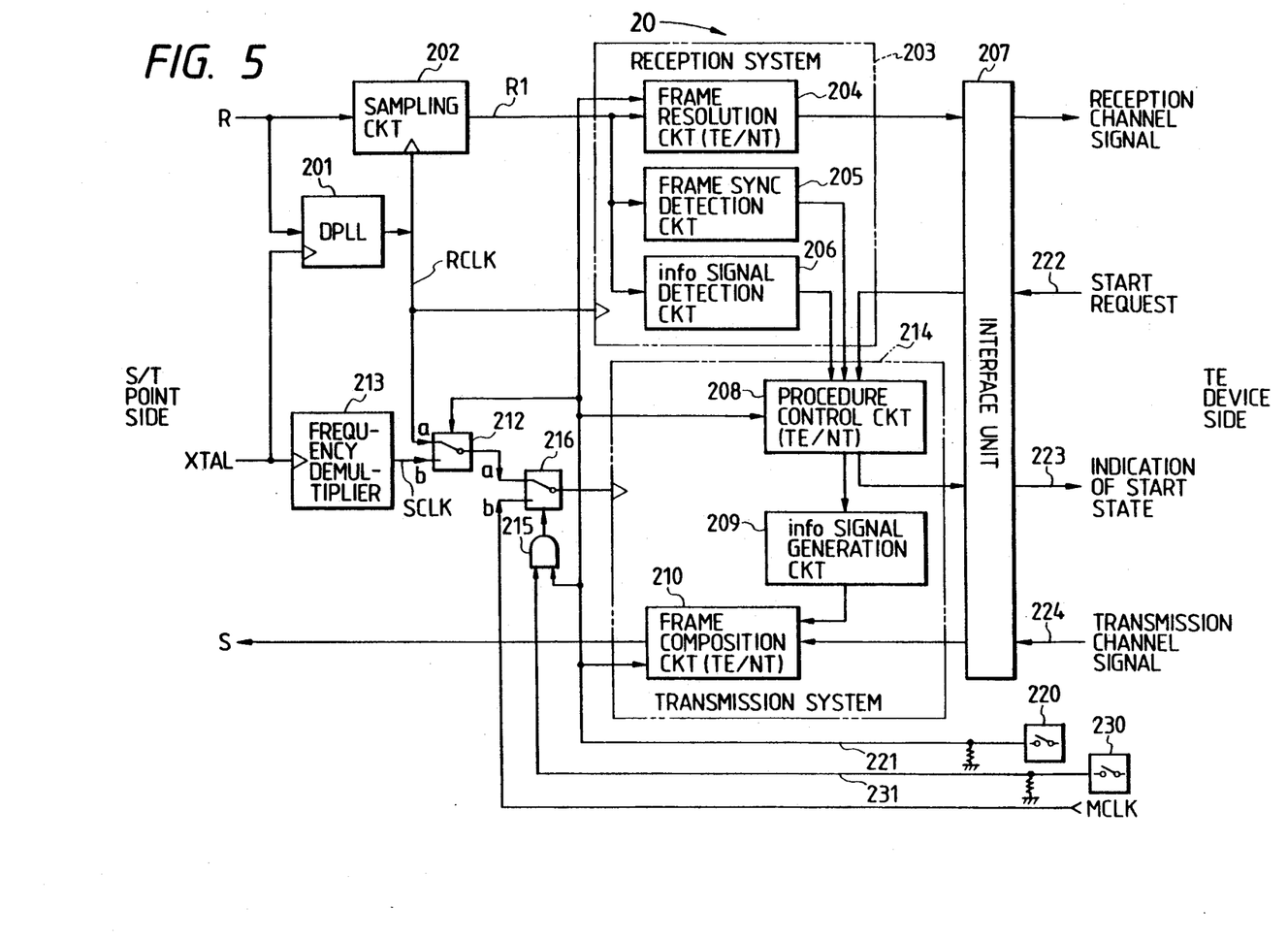
FIG. 5 is a block diagram showing a construction of a communication interface in the second embodiment.

FIG. 5 is a block diagram showing a detailed construction of the ISDN i/f unit 20 of the communication terminals 24, 25, and 26 in FIG. 2. The ISDN i/f unit 20 can operate in the following three modes.

That is, the first mode relates to the case where the ISDN i/f unit 20 functions as the TE layer 1 interface as shown in FIG. 2A. The second mode relates to the case where the ISDN i/f unit 20 functions as the NT layer 1 interface as shown in FIG. 2B. The third mode relates to the case where the ISDN i/f unit 20 functions as the pseudo NT layer 1 interface as shown in FIG. 2C.

The ISDN i/f unit 20 shown in FIG. 5 is also constructed by a one-chip LSI in a manner similar to that shown in FIG. 1.

In FIG. 5, R indicates the control input signal which is obtained by binarizing the signal (the signal from the NT in the case of operating as a TE layer 1 or the signal from the TE in the case of operating as an NT layer 1 or pseudo NT layer 1) received from the S/T interface. XTAL indicates the original clock signal input from the outside (in the communication device 24, 25, or 26). Reference numeral 201 denotes a frequency demultiplexer (DPLL) for extracting the transmission frequency component included in the control input signal R, for frequency demultiplexing the original clock signal XTAL in accordance with the frequency dividing ratio shown by R, and for outputting as a bit rate timing signal (RCLK). Reference numeral 202 denotes a sampling circuit for sampling the control input signal R at the timing of the RCLK and for specifying as a reception bit train ($R_1$). The reception bit train specified as mentioned above is a bit train as shown in, e.g., FIG. 4.

Reference numeral 203 denotes a reception system circuit and its construction will now be described. Reference numeral 204 denotes a frame resolution circuit for receiving a switch signal 221 and functions as a TE layer 1 when the switch signal 221 is at the low level, that is, when a switch 220 is set to OFF. The frame resolution circuit 204 functions as an NT layer 1 when the switch signal 220 is at the high level. Now, assuming that the switch signal 221 is at the low level, as shown in FIG. 2A, the frame resolution circuit 204 functions as a TE layer 1 interface and resolves the bit train (40 in FIG. 4) of the frame construction transmitted from the NT through the sampling circuit 202 into the $B_1$, $B_2$, D, and E channels and outputs to the terminal device 22′ side via interface unit 207.

On the contrary, when the switch signal 221 is at the high level, the frame resolution circuit 204 functions as a pseudo NT layer 1 or NT layer 1 in accordance with the switch signal 221. Therefore, the frame resolution circuit 204 resolves the frame data shown by 41 in FIG. 4 which was transmitted from the TE through the sampling circuit 202 into the $B_1$, $B_2$, and D channels so as to receive the frame data and outputs to the ISDN or terminal device 22′ side. When the frame resolution circuit 204 operates as a pseudo NT layer 1, the terminal device 22′ operates as a pseudo ISDN network.

Reference numeral 205 denotes a frame sync detection circuit for detecting and monitoring the synchronization of the frame during the receiving process on the basis of a frame bit F and outputting the result to a procedure control circuit 208. Reference numeral 206 indicates a detection circuit to detect an info signal as shown in FIG. 7. When the info signal is detected, the detection circuit 206 outputs the result to the procedure control circuit 208.

Reference numeral 214 denotes a transmission system circuit and its construction will now be described. The procedure control circuit 208 receives output signals of the frame sync detection circuit 205 and info signal detection circuit 206 and also receives a start request signal 222 which is input from the interface unit 207. When the switch signal 221 is at the low level, the procedure control circuit 208 discriminates by the procedure on the TE layer 1 side on the basis of the input signals and indicates an info signal generation circuit 209 to transmit an info signal so as to respond to the distant side NT. The procedure control circuit 208 also turns on or off a start state indication signal 223 in accordance with the progress of the procedure and informs the start or stop state to the terminal device 22′ side through the interface unit 207.

On the contrary, when the switch signal 221 is at the high level (NT layer 1), the procedure control circuit 208 discriminates by the procedure on the NT layer 1 side on the basis of the input signals and indicates the info signal generation circuit 209 to transmit an info signal so as to respond to the distant side TE terminal (e.g., TE 22). Reference numeral 209 denotes the info signal generation circuit to generate the corresponding info signal in accordance with the instruction from the procedure control circuit 208. Reference numeral 210 denotes a frame composition circuit for receiving a transmission channel signal 224 and info signal from the terminal device 22′ and for making and outputting a frame signal.

When the switch signal 221 is at the low level (when the switch 220 is set to OFF), the frame composition circuit 210 reconstructs the info signal from the info signal generation circuit 209 and the transmission channel signals 224 of the $B_1$ channel, $B_2$ channel, D channel, and the like which are input from the terminal device 22′ into a frame for transmission of the TE layer 1 and outputs as an output signal S to the transmission path side (for instance, like the frame bit train 41 in FIG. 4). At this time, the RCLK is used as a transmission clock signal. On the other hand, when the switch signal 221 is at the high level (when the switch 200 is set to ON), the frame composition circuit 210 makes the bit train shown by the frame construction 40 in FIG. 4 and outputs the output signal S. In this case, the SCLK is used as a transmission clock signal in the case of the pseudo NT layer 1 mode (FIG. 2C) or the MCLK is used as a transmission clock signal in the case of the NT layer 1 mode (FIG. 2B).

FIG. 3 is a diagram showing the difference of the frame data depending on the transmitting direction between the NT device and the TE terminal as mentioned above in the layer 1.

Reference numeral 30 denotes the frame construction from the NT device to the TE terminal and 31 indicates the frame construction from the TE terminal to the NT device. $B_1$ and $B_2$ denote information channels of 64 kbits/sec, D indicates a common line signal channel of 16 kbits/sec, and E represents an echo bit.

Returning to FIG. 5, reference numeral 212 denotes a switch to change the connection in correspondence to the level of the switch signal 221. When the switch signal 221 is at the low level (when the switch 220 is set to OFF), the switch 220 is connected to a contact a side and the TE layer 1 mode is set. The RCLK is input as a clock signal of the transmission system circuit 214. On the contrary, when the switch signal 221 is at the high level (when the switch 120 is set to ON), the switch 220 is connected to a contact b side. The SCLK, which will be explained hereinlater, is input as a clock signal of the transmission system circuit 114. At this time, a switch 230 is set to OFF. Therefore, the pseudo NT layer 1 mode is set.

Reference numeral 213 denotes a frequency demultiplexer for frequency demultiplexing the original clock signal XTAL by a preset frequency dividing ratio and for outputting a pseudo bit rate clock signal SCLK. Reference numeral 220 denotes the switch for switching the switch signal 221 as mentioned above, thereby indicating whether the communication terminal is allowed to function as a TE layer 1 or an NT layer 1. When the switch 220 is set to OFF, the TE layer 1 is indicated. When the switch 220 is set to ON, the NT layer 1 is indicated.

A switch signal 231 is set to the high level when the switch 230 is set to ON. The switch signal 31 is set to the low level when the switch 230 is set to OFF. When both of the switches 220 and 230 are set to ON, an AND circuit 215 is opened and a switch 216 is switched to a terminal b side. Thus, the master bit rate clock signal (MCLK) defined on the ISDN side is input to the transmission system circuit 114. Thus, a frame can be output to the ISDN network and the device can function as an NT device.

With the above construction, when both of the switches 220 and 230 are set to OFF (TE layer 1), the RCLK is used as a clock signal of each of the reception system circuit 203 and the transmission system circuit 214. The circuits 203 and 214 operate in accordance with the RCLK. The frame resolution circuit 204 receives the frame shown by 40 in FIG. 4 from the NT device and outputs to the TE side by the reception channel. On the other hand, upon transmission, the procedure control circuit 208 generates an info signal in accordance with the control procedure for the TE layer 1 and responds to the NT side by the frame composition circuit 210.

When the switch 220 is set to ON and the switch 230 is set to OFF (pseudo NT layer 1), the RCLK is used as a clock signal of the reception system circuit 203 and the SCLK is used as a clock signal of the transmission system circuit 214. At this time, the frame resolution circuit 204 is set so as to receive and resolve the frame shown by 41 in FIG. 4. The transmission system circuit 214 is driven by the clock signal (SCLK) of the NT layer 1 and makes the frame data shown by 40 in FIG. 4 to be transmitted to the TE side and outputs from the frame composition circuit 210.

Next, when both of the switches 220 and 230 are set to ON, the RCLK is used as a clock signal of the reception system circuit 203 and the frame resolution circuit 204 is set to the NT layer 1. On the other hand, since the switch 216 is switched to the terminal b side, the MCLK is used as a clock signal of the transmission system circuit 214. Both of the procedure control circuit 208 and frame composition circuit 210 are switched to the NT layer 1. Thus, the transmission system circuit 214 functions as an NT device and the frame data can be transmitted and received between the TE terminal and the ISDN network.

In the embodiment, the switching of the layer 1 in the communication terminal 20 has been indicated by the switches 220 and 230. However, the invention is not limited to such a method. The switching of the layer 1 can be also obviously designated by a signal, command, or the like from the TE terminal side.

As described above, according to the second embodiment, since the clock signal (RCLK) from the reception signal, clock signal (SCLK) based on the internal oscillator, and clock signal (MCLK) from the outside can be selectively used as a clock signal which is used for the ISDN layer 1 interfaces the communication interface can be used as a TE layer 1 interface and an NT layer 1 interface.

On the other hand, by attaching the ISDN layer 1 interface to the TE terminal, the TE terminal can function not only as a TE terminal but also an NT device. Therefore, there are advantages such that, for instance, the two-way connection test of the TE terminal can be executed separately from the ISDN network and the working efficiencies of the maintenance and inspection services and the like of the TE terminal, NT device, and the like can be remarkably improved.

Although the embodiment has been described with respect to the layer 1 interface of the communication using the ISDN as an example, the invention can be also used as a layer 1 interface in the case of using another digital communication network.

The present invention is not limited to the foregoing embodiments but many modifications and variations are possible within the spirit and scope of the appended claims of the invention.

What is claimed is:

1. A communication interface for a network terminal device and a standard terminal connected to the network terminal device, used in a communication network comprising an Integrated Services Digital Network, the network terminal device and the standard terminal, said interface comprising:

communication control means for controlling data transmission/reception, executing a first communication control operation for controlling the data transmission/reception to/from the network terminal device by using said communication interface as an interface for the standard terminal, and executing a second communication control operation for controlling data transmission/reception to/from the Integrated Services Digital Network to/from the standard terminal by using said communication interface as an interface for the network terminal device;

first switching means for switching between said first and second communication control operations by said communication control means such that said first communication control operation is executed by said communication control means when said communication interface is used as the interface for the standard terminal and said second communication control operation is executed by said communication control means when said communication interface is used as the interface from the network terminal device; and second switching means for switching a clock source used by said communication control means, in accordance with said switching operation of said first switching means.

2. A communication interface according to claim 1, wherein said first communication control operation controls the data transmission/reception to/from the network terminal device by using said communication interface as a layer 1 interface for the Integrated Services Digital Network standard terminal.

3. A communication interface according to claim 1, wherein said second communication control operation controls the data transmission/reception to/from the Integrated Services Digital Network and to/from the standard terminal by using said communication interface as a layer 1 interface for the network terminal device connected to the Integrated Services Digital Network.

4. A communication interface according to claim 1, wherein said communication control means has:

extracting means for extracting a clock signal from data which is sent from the network terminal device; and first control means for controlling transmission and reception of the data to/from the network terminal device on the basis of said extracted clock signal.

5. A communication interface according to claim 4, wherein when said first switching means switches to the first communication control operation said first control means executes the transmission of the data to the network terminal device and the reception of the data from the network terminal device on the basis of said extracted clock signal.

6. A communication interface according to claim 1, wherein said communication control means has:

extracting means for extracting a clock signal from the data which is sent from the standard terminal;

receiving means for receiving a clock signal from the outside of said communication interface, and the communication network; and second control means for controlling the transmission and reception of the data to/from the Integrated Services Digital Network on the basis of said extracted clock signal and said clock signal from the outside of said communication interface and the communication network.

7. A communication interface according to claim 6, wherein when said first switching means switches to the second communication control operation said second control means executes the reception of the data from the standard terminal on the basis of said extracted clock signal and the transmission of the data to the standard terminal on the basis of said clock signal received.

8. A communication interface according to claim 1, further having means for receiving a clock signal sent from the network and supplying said clock signal to the communication control means.

9. A communication interface comprising:
  extracting means for extracting a clock signal from data received from a network terminal device and from a standard terminal;
  input means for inputting a clock signal from an internal oscillator the period of which is different from the period of the extracted clock signal; and
  communication control means for controlling data transmission/reception on the basis of the clock signal extracted by said extracting means and the clock signal input by said input means,
  wherein said communication control means executes a first communication control operation for controlling the data transmission/reception to/from the network terminal device on the basis of the clock signal extracted from the data received from the network terminal device, by using said communication interface as an interface for the standard terminal, and
  said communication control means executes a second communication control operation for controlling data reception from the standard terminal based on the clock signal extracted from the received data from the standard terminal, and data transmission to the standard terminal using the input clock signal, by using said communication interface as an interface for the network terminal device.

10. A communication interface according to claim 9, further having selecting means for selecting the first communication control operation or the second communication control operation.

11. A communication interface according to claim 10, wherein when said selecting means selects said first communication control operation, said communication interface operates as an interface for the Integrated Services Digital Network standard terminal, and when said selecting means selects said second communication control operation, said communication interface operates as an interface for the network terminal device.

12. A communication interface for a communication system comprising an Integrated Services Digital Network, a network terminal device and a standard terminal connected to the network terminal device, said communication interface comprising:
  extracting means for extracting a first clock from data transmitted from the network terminal device;
  generating means for generating a second clock from a clock of an internal oscillator;
  inputting means for inputting a third clock transmitted from said Integrated Services Digital Network; and
  communication control means for controlling data transmission/reception on the basis of said first, second and third clocks,
  wherein said communication control means executes control for data transmission to said network terminal device on the basis of said first clock, control for data transmission to said standard terminal on the basis of said second clock, and control for data transmission to said standard terminal or said Integrated Services Digital Network on the basis of said third clock.

13. A communication interface according to claim 12, further having selecting means for selecting one of said first, second, and third clocks.

14. A communication interface according to claim 13, wherein when said first clock is selected by said selecting means, said communication interface operates as an interface for the Integrated Services Digital Network standard terminal.

15. A communication interface according to claim 13, wherein when said second clock is selected by said selecting means, said communication interface operates as a pseudo interface for the network terminal device of the Integrated Services Digital Network even if said communication interface is not connected to the Integrated Services Digital Network.

16. A communication interface according to claim 13, wherein when said third clock is selected by said selecting means, said communication interface operates as an interface for the Integrated Services Digital Network terminal device.

17. A communication interface according to claim 12, wherein said communication interface is constructed as a one-chip LSI.

* * * * *

UNITED STATES PATENT AND TRADEMARK OFFICE
CERTIFICATE OF CORRECTION

PATENT NO. : 5,117,425
DATED : May 26, 1992
INVENTOR(S) : YUKIHIKO OGATA

It is certified that error appears in the above-identified patent and that said Letters Patent is hereby corrected as shown below:

IN [57] ABSTRACT

Line 7, "between to switch" should read --to switch between--.
Line 11, "cuted" should read --cutes--.

COLUMN 3

Line 32, "unit 0" should read --unit 20--.

COLUMN 5

Line 54, "numeral 20" should read --numeral 120--.
Line 55, "signal 21" should read --signal 121--.
Line 59, "switch 20" should read --switch 120--.
Line 61, "switch 20" should read --switch 120--.

COLUMN 6

Line 10, "sc" should read --so--.

COLUMN 8

Line 12, "switch 200" should read --switch 220--.
Line 38, "switch 120" should read --switch 220--.
Line 56, "signal 31" should read --signal 231--.

COLUMN 10

Line 3, "interface" should read --communication interface--.
Line 12, "to/-" should read --and to/- --.
Line 25, "from" should read --for--.

UNITED STATES PATENT AND TRADEMARK OFFICE
CERTIFICATE OF CORRECTION

PATENT NO. : 5,117,425
DATED : May 26, 1992
INVENTOR(S) : YUKIHIKO OGATA

It is certified that error appears in the above-identified patent and that said Letters Patent is hereby corrected as shown below:

COLUMN 10

Line 46, "has:" should read --comprises:--.
    Line 55, "operation" should read --operation,--.
    Line 61, "has:" should read --comprises:--.

COLUMN 11

Line 7, "operation" should read --operation,--.
    Line 14, "having" should read --comprising--.
    Line 45, "having" should read --comprising--.

COLUMN 12

Line 29, "having" should read --comprising--.

Signed and Sealed this

Fourteenth Day of September, 1993

Attest:

BRUCE LEHMAN

*Attesting Officer*      Commissioner of Patents and Trademarks